J. P. MENTZER.
WATER COLOR PAINT PACKAGE.
APPLICATION FILED MAY 22, 1917.
1,292,350.
Patented Jan. 21, 1919.
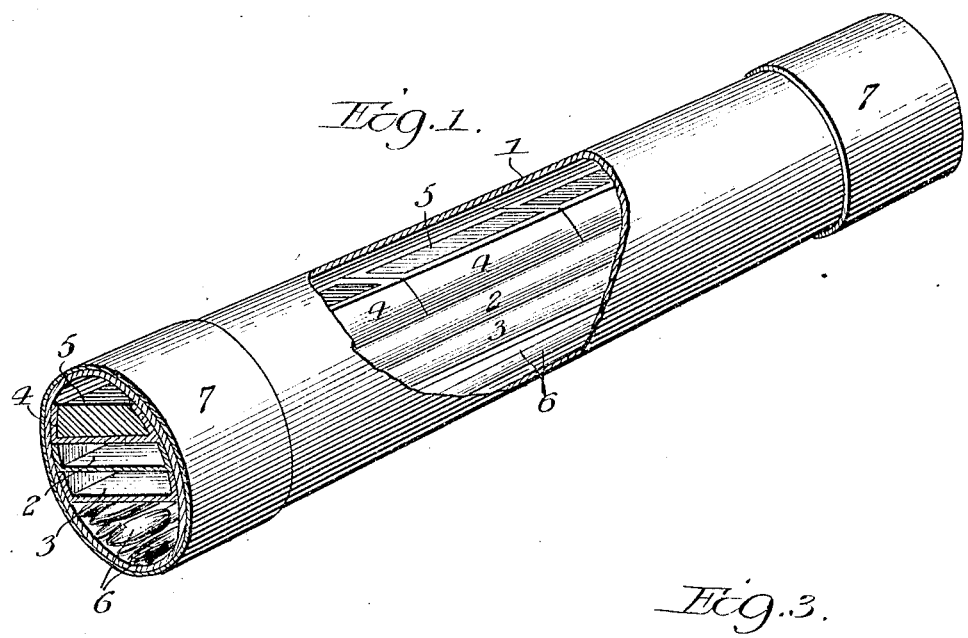
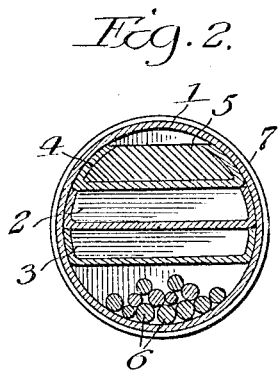
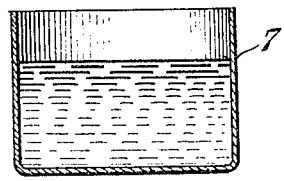
Inventor
John P. Mentzer

UNITED STATES PATENT OFFICE.

JOHN P. MENTZER, OF CHICAGO, ILLINOIS.

WATER-COLOR-PAINT PACKAGE.

1,292,350. Specification of Letters Patent. Patented Jan. 21, 1919.

Application filed May 22, 1917. Serial No. 170,182.

*To all whom it may concern:*

Be it known that I, JOHN P. MENTZER, a citizen of the United States, residing at Chicago, in the county of Cook and State of Illinois, have invented a certain new and useful Improvement in Water-Color-Paint Packages, of which the following is a full, clear, concise, and exact description, reference being had to the accompanying drawings, forming a part of this specification.

My invention relates to water color paint packages.

An object of the invention is to provide a practical and inexpensive form of package containing or embodying the various articles for water color painting used by children in schools, for example the paint brushes, the blocks or squares of paint, the trays for mixing the paints and the cup or cups for holding the water to be used in the trays.

Another object of the invention is to make possible the embodiment of all of these articles in a single package which may be assembled, shipped and then reassembled after use as a single package or entity.

In carrying out the invention I provide a casing or receptacle capable of receiving certain of the articles, as for example the paints, the brushes, the trays and so on, and also provide complemental members which will go to make up the aforesaid complete casing or receptacle but which at the same time may be detached or separated therefrom and may be used as the cups for the water.

As a simple arrangement the casing or receptacle may be made of tubular form and the complemental members as caps to fit over the end of the same, in which case the paints, brushes, and so on will be arranged in the tubular casing and the caps fitted over the end so as to close the same but made removable or detachable therefrom so as to serve as water cups.

In the accompanying drawings Figure 1 is a perspective view of a paint package embodying my present invention;

Fig. 2 is a cross section of the same; and

Fig. 3 is a view of one of the supplemental members or caps detached from the casing or receptacle.

Referring to the drawings I show a receptacle 1 preferably in the form of a tubular casing which is made of suitable material, such for example, as leather, papiermâché, metal or the like, and while shown of circular cross-section, may have different forms. This casing 1 is of such size as to contain a plurality of trays 2 and 3, such as are ordinarily used by school children or other students in the mixing of water color paints. The trays 2 and 3 are preferably made of substantially the length of the tube 1 and practically the width of a diameter of the same, so that said trays will fit snugly within a central longitudinal portion of the tube 1. A case 4 containing paints 5 is also arranged within the casing 1, said case 4 or several of such cases being mounted above the trays 2 and 3 and being preferably made of such size and shape as to fit snugly within the upper portion of the casing 1, having inclined and curved sides to substantially correspond with the curvature of that portion of the tube 1 located above the trays 2 and 3.

There are also located within the casing 1 a plurality of brushes 6—6 such as are ordinarily used for water color work. These are conveniently arranged lengthwise of the tube 1 in the space below the trays 2 and 3.

The tube 1 is preferably opened at its ends and the latter are covered by members or caps 7—7, which are adapted to fit snugly over the end portions of the tube so as to effectually close the same, but at the same time they are adapted to be removed or separated from the casing or tube 1 and to be used as cups or basins to hold water to be used in connection with the paints. In Fig. 1 I show the caps or cups 7 mounted upon the ends of the casing 1, and in Fig. 3 I show one of said caps 7 detached from the casing 1 and arranged in an upright position like a cup so as to receive and hold water.

In this way all of the articles to be used in connection with water color painting are inclosed and embodied in a single unitary structure or package and consequently can be assembled and shipped in such compact and reduced form. When opened up for use the various parts may be taken off or out as desired and used, and then the whole may be reassembled in the same shape and size as before. Consequently there is not only a reduction and compactness in size for assemblage and transportation, but at the same time the use of the package and its articles from time to time does not in any way increase the size or prevent the articles from being reassembled in the same size and shape as before. Obviously only one of the ends may be made removable and adapted to serve as a cup.

It will be understood that changes and modifications may be made without departing from the spirit of the invention.

What I claim is:

1. A package of the kind specified comprising an integral tubular member and a set of trays arranged within said tubular member, said trays extending longitudinally of said member and crosswise of the same so as to fit against the sides of the interior of said tubular member, said trays being mounted above one another and resting upon each other and said trays being arranged in both the upper and lower longitudinal portions of said tubular member whereby said trays hold each other in position.

2. A package of the kind specified comprising an integral tubular member having an open end, a series of trays arranged within said tubular member and extending longitudinally of the same, said trays being longitudinally movable so as to permit their insertion into the tube and withdrawal from the same through said open end, said trays being arranged one above the other and resting upon each other and extending across the entire width of said tubular member so as to fit against the sides thereof, there being trays in both the upper and lower longitudinal portions of said tubular member whereby said trays hold each other in position.

3. A package of the class specified comprising an integral tubular casing having one of its ends open and provided with a detachable cap capable of closing said open end and also capable of holding water, and a series of trays arranged within said tubular member and longitudinally of the same, said trays being longitudinally movable to permit their insertion into and withdrawal from said tubular member through the open end thereof, said trays being arranged one above the other and resting upon one another and extending crosswise substantially the width of the tubular member and provided with curved sides adapted to fit the interior curved walls of said tubular member, there being trays in both the upper and lower longitudinal portions of said tubular member to permit said trays to hold each other in position.

4. A package of the kind specified comprising an integral tubular member having one of its ends open and provided with a detachable cap, said tubular member containing a set of trays arranged lengthwise of said member and insertible through said open end of the same, said trays resting upon one another and extending from side to side of the tubular member and fitting against the interior side walls of the same, there being space below said trays for holding various articles.

In witness whereof I hereunto subscribe my name this 25th day of April A. D., 1917.

JOHN P. MENTZER.

Witnesses:
A. L. JONES,
O. M. WERNICH.

Copies of this patent may be obtained for five cents each, by addressing the "Commissioner of Patents, Washington, D. C."